United States Patent

Sarallo et al.

[15] 3,651,407

[45] Mar. 21, 1972

[54] AUTOMATIC ENCODER-DECODER CIRCUIT FOR RADIO COMMUNICATIONS UNIT

[72] Inventors: John F. Sarallo, Arlington Heights; George W. Shetzley, Roselle, both of Ill.

[73] Assignee: Motorola, Inc., Franklin Park, Ill.

[22] Filed: Oct. 5, 1970

[21] Appl. No.: 77,958

[52] U.S. Cl. ....................................325/18, 325/21, 325/55, 325/466, 343/227, 343/228

[51] Int. Cl. ..........................................................H04b 1/48

[58] Field of Search ......................325/15, 18, 21, 22, 55, 64, 325/392, 466, 348; 343/225, 226, 227, 228; 340/171 R, 171 A

[56] References Cited

UNITED STATES PATENTS 3,496,467 2/1970 Lundgrew................................325/21

*Primary Examiner*—Robert L. Griffin
*Assistant Examiner*—Kenneth W. Weinstein
*Attorney*—Vincent J. Rauner and L. Arnold

[57] ABSTRACT

An encoder-decoder for a radio communications unit includes oscillator control circuitry, actuated for a predetermined period of time in response to initiation of a transmission. The oscillator control circuitry actuates oscillator circuitry for applying one or more tones to the transmitter, disables the tone decoder, and is then inhibited from further activating the oscillator circuitry. The decoder is operative in response to the receipt of one or more tones of particular frequency to render the receiver audio operative in response to carrier squelch signals, and inhibits subsequent operation of the oscillator control circuitry. Placing the microphone in the hang-up box at the end of a message resets the encoder-decoder. A subsequent transmission will now include the tone signals and the receipt of the correct tone frequencies will be required to again enable the receiver circuitry. A select switch allows the communication unit to be operated with or without the automatic encoder-decoder squelch circuit.

9 Claims, 1 Drawing Figure

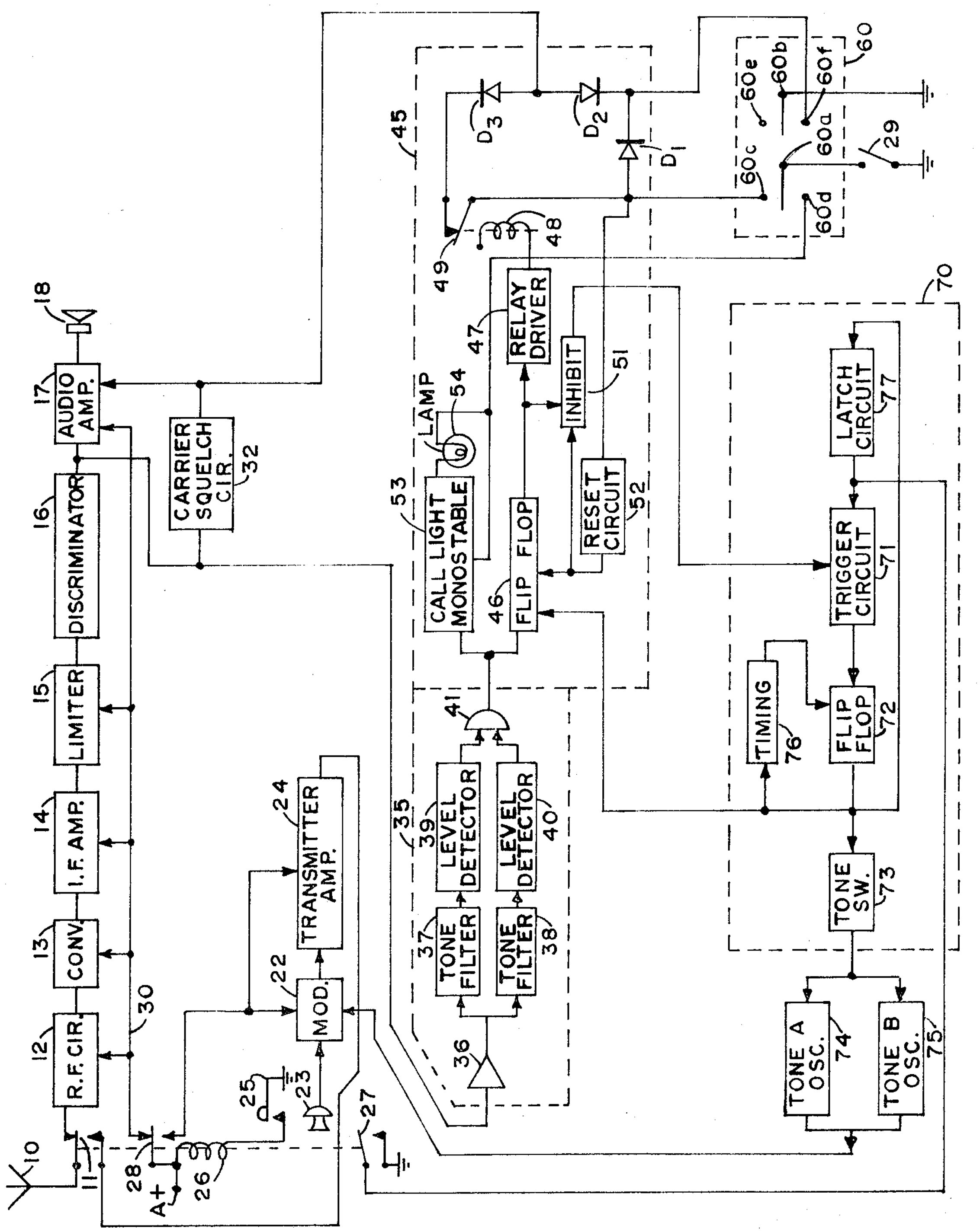
INVENTORS
JOHN F. SARALLO
GEORGE W. SHETZLEY
BY Vincent J. Rauner
ATTY.

AUTOMATIC ENCODER-DECODER CIRCUIT FOR RADIO COMMUNICATIONS UNIT

BACKGROUND OF THE INVENTION

In two-way communications systems, squelch circuits are provided to cut off the audio output of the receiver at all times except when a desired signal is being received. Carrier squelch circuits operate in response to the reception of an RF carrier, and tone squelch circuits operate in response to the receipt of a particular tone or tones transmitted in the system.

In a first type of tone squelch system, the tone may be at a frequency outside the band of modulating frequencies and transmitted continuously with the signal. In a second type of tone squelch system, one or more tones are transmitted simultaneously or sequentially and prior to the message transmission, requiring the message transmission to be delayed until the tones have terminated. In such systems, the tones must be transmitted by the operator at each end of the communications link before that operator can communicate with the party at the other end of the communications link. The requirement that both parties transmit tones at the initiation of their transmissions is objectionable because both operators must wait while the tones are sent out, and because of the additional time that the communications system is tied up due to these delays.

SUMMARY OF THE INVENTION

It is, therefore, an object of the invention to provide an improved automatic encoder-decoder circuit for a radio communications unit wherein a tone or tones are used to control the audio reproduction of a receiver.

It is another object of this invention to provide an automatic encoder-decoder circuit for a radio communications unit wherein the tone or tones are transmitted only at the first transmission from the first station and are not transmitted with any successive transmission in the same series from any station participating.

In practicing this invention, and encoder-decoder circuit for a radio communications unit is provided including an oscillator control circuit which is actuated in response to initiation of a transmission. The oscillator control circuit includes a timing circuit and latch circuit for holding the oscillator control circuit in an actuated state for a predetermined period of time. The oscillator control circuit when actuated in turn actuates oscillator circuitry for applying one or more tones to the transmitter. The oscillator control circuit also actuates a control circuit which renders the receiver audio thereafter operative in response to carrier squelch signals, and inhibits further operation of the oscillator control circuit when the transmitter is subsequently energized.

The decoder circuit includes a detector operative in response to the receipt of one or more tones of particular frequency to actuate the control circuit and renders the receiver audio thereafter operative in response to carrier squelch signals. The control circuit when actuated by the detector inhibits further operation of the oscillator control circuit when the transmitter is subsequently energized to prevent transmission of the tones.

A hang-up box is provided for holding the communication unit microphone when not in use. Placing the microphone in the hang-up box at the end of a message operates to reset the control circuit. A subsequent transmission will now include the tone signals from the encoder, and the receipt of the correct tone frequencies by the decoder will be required to again enable the receiver.

A select switch provided with the unit allows the communication unit to be operated with or without the automatic encoder-decoder squelch circuit. A call light circuit and call light are also provided with the encoder-decoder. With the select switch placed in a call light position, the call light will energize and remain so when the correct tone frequencies are detected. This enables the operator to leave the vehicle and have knowledge of the receipt of a message while away.

Removal of the microphone from the hang-up box at initiation of a transmission, or depression of a monitor switch on a console type microphone, disables the decoder allowing operation of the receiver either in response to a carrier squelch signal, or for monitoring the receiver channel.

BRIEF DESCRIPTION OF THE DRAWING

The single FIGURE is a block diagram of a radio communications unit employing the automatic encoder-decoder circuit of this invention.

DESCRIPTION OF THE PREFERRED EMBODIMENT

Referring now to the drawing, there is shown a two-way radio communications unit including an antenna 10 which applies signals through switch contact 11 to a radio frequency circuit 12. This circuit selects signals in a particular frequency band, and may or may not include an amplifier to increase the level of the received signals. The signals are applied to a converter 13 which reduces the frequency to an intermediate frequency. The converter 13 may include one or more stages of frequency conversion with crystal oscillators to provide the local oscillations.

The intermediate frequency (IF) signal is amplified at amplifier 14 and limited in limiter 15, each of which may include a plurality of stages. The modulation is derived from the limited wave by discriminator 16 which applies the audio signal to audio amplifier 17. The amplified audio signal is reproduced by loudspeaker 18.

The transmitter of this system includes a modulator 22 to which audio signals are applied by microphone 23. The modulator may include an oscillator for producing a carrier wave, or a separate oscillator can be used. The modulated wave is amplified in amplifier 24, and if desired, this may include frequency multiplier stages to provide the desired output frequency. The microphone 23 may be of the hand held or desk top type and includes a push-to-talk switch 25 which when closed energizes relay 26. Relay 26 actuates the antenna switch contact 11, a power supply switch contact 28, and a switched ground contact 27. When the push-to-talk switch is operated, the output of the transmitter is applied through switch contact 11 to antenna 10. At this time, A+ power is applied through switch contact 28 to the stages of the transmitter, and a switched ground is applied to the encoder through contact 27. When relay 26 is released, by the release of push-to-talk switch 25, contact 28 applies A+ power to the stages of the receiver.

The communication unit is provided with a hang-up switch 29 which is used for holding the microphone when not in use. Hang-up switch 29 is closed when the microphone is in the position thereon. When the microphone is removed from the hang-up switch for use, switch 29 is open. If a console type microphone is used instead of a mobile type microphone, hang-up switch 29 is not provided. In its place, however, is a monitor switch located on the microphone. When the monitor switch is depressed, the contacts are opened, and when the switch is released, the switch contacts are closed.

The audio output from discriminator 16 is applied to carrier squelch circuit 32 which selects signals at a frequency above the audio or other modulating signals, then limits and rectifies the same to produce a control signal. The control signal operates a semiconductor switch which provides a ground to audio amplifier 17, reverse biasing the stages in the audio amplifier, thereby rendering it inoperative. When no carrier signal is present, a strong noise signal above the frequency of the modulation signal will be produced, developing a control signal which reverse biases the audio amplifier. The carrier squelch circuit will permit the audio output to be operative when a carrier signal is received.

The automatic encoder-decoder circuit includes a tone frequency detector 35 coupled to the output of discriminator 16. Signals coupled from discriminator 16 to tone frequency detector 35 are amplified in amplifier 36 and coupled to tone filters 37 and 38. Tone filters 37 and 38 may be resonant reed devices or may be tuned circuits, each tuned to select a particular frequency. Tones of the appropriate frequencies are selected by filters 37 and 38 and coupled to level detectors 39 and 40, respectively. Level detectors 39 and 40 include a delay circuit so that a selected signal coupled thereto must be applied for a predetermined time period in order to develop a detection signal. The detection signals are coupled from detectors 39 and 40 to AND gate 41. If both detection signals are present simultaneously, at the inputs to AND gate 41, AND gate 41 will develop and AND gate signal which will be coupled to control circuit 45.

The AND gate signal coupled to control circuit 45 is coupled to bistable multivibrator 46 causing it to change states and develop a first signal. The first signal is coupled to relay driver 47 which is operative in response to the first signal to cause relay 48 to energize. With relay 48 energized, contact 49, a normally closed contact on relay 48, is opened breaking a tone squelch ground connection to audio amplifier 17, which is provided through selector switch 60 and hang-up box switch 29. The tone squelch ground connection normally provided through contact 49, switch 60, and hang-up box 29, parallels and performs the same function as the ground connection provided by carrier squelch circuit 32. That is, it reverse biases the stages in audio amplifier 17, rendering them nonconductive. With the ground path provided by contact 49 open circuited, the carrier squelch circuit will permit audio amplifier 17 to be operative when a carrier signal is received.

Selector switch 60 is provided in order to give the operator the option of operating the communications unit receiver with or without the tone decoder, and to allow the operator to recognize receipt of a message received while the operator is away from the communications unit.

Selector switch 60 shown in this embodiment is a two pole, three position switch having movable contacts **60*a* and 60*b* which cooperate with fixed contacts 60*c* and 60*d*, and 60*e* and 60*f*, respectively. With no closure between contacts 60*a* and 60*c*, the tone squelch ground path provided through contacts 49 of relay 48 to the audio amplifier 17 is broken, or open circuited, allowing receiver operation in the carrier squelch mode. If select switch 60 is in the "select" position, that is, a closure between contacts 60*a* and 60*c*, the tone squelch ground path is provided, allowing receiver operation only in response to the correctly tone coded signal. When selector switch is in the call light position, that is, a closure between contacts 60*a* and 60*d*, and between 60*b* and 60*f*, a ground path is provided, allowing operation of call light circuit 53 and call light 54 when an AND gate signal is developed by AND gate 41**.

Control circuit 45 also includes a bistable multivibrator 51 coupled to the output of bistable 46. Bistable 51 is an inhibit bistable which operates in response to the first signal developed by bistable 46 to also develop a first signal. The first signal developed by bistable 51 is coupled to oscillator control circuit 70, in the encoder, to prevent subsequent operation of the encoder and transmission of tones. As can be seen, receipt of the correctly tone coded signal by the automatic encoder-decoder acts not only to deactivate the tone decoder, thereby allowing subsequent conversation when a carrier squelch signal is received, but also acts to deactivate the encoder circuitry allowing the operator to respond without the delay incurred by first transmitting the encoder tones. The operator need not send out the encoder tones at this time for reasons which will be more fully explained in a subsequent portion of this specification.

Control circuit 45 further includes reset circuit 52 coupled to bistables 46 and 51 and to select switch 60. At the end of a communication which includes a number of exchanges between the communicating parties, and during which microphone 23 remains off hang-up switch 29, the microphone is returned to hang-up switch 29. This will provide a ground connection through hang-up switch 29, contacts **60*a* and 60*c* of select switch 60 to reset circuit 52. The ground connection will cause reset circuit 52 to apply a pulse to bistables 46 and 51 causing both the reset to their original state and eliminating the first signals developed by each. With bistable 46 reverted to its first state, relay driver 47 will deenergize closing contact 49 and again providing the tone squelch ground path to audio amplifier 17. With bistable 51 reset, the inhibit first signal is no longer provided to oscillator control circuit 70**, thereby allowing operation of same.

When it is desired to transmit, microphone 23 is removed from hang-up switch 29. With select switch 60 in the select position, that is, contact **60*a* and 60*c* connected, the opening of hang-up switch 29 by removal of the microphone breaks the tone squelch ground path to audio amplifier 17. This permits carrier squelch circuit 32 to open the audio of the receiver when a carrier is present, allowing the operator to hear any communication which may be present on the channel. If the automatic encoder-decoder system described herein is used with a console microphone, hang-up switch 29 is replaced with a monitor switch located in the base of the console microphone. Depression of the monitor switch opens the contacts thereby performing the same function as is performed by removal of the microphone from the hang-up switch. If the operator hears no communication when he removes the microphone from the switch 29, or when he depresses the monitor switch, he can operate his push-to-talk switch 25 to condition the system for transmission. This operates contact 11 to connect the transmitter output to the antenna, contact 28 to apply A+ power to the transmitter stages, and contact 27** to provide a switched ground connection to the encoder.

The ground connection provided by contact 27 is coupled to trigger circuit 71 in oscillator control 70. Trigger circuit 71 may be a single transistor biased into conduction or non-conduction by the application of the ground signal, or a Schmitt trigger. Trigger circuit 71 develops a pulse in response to the ground provided by contact 29 which is coupled to bistable multivibrator 72. Bistable multivibrator 72 changes states in response to the pulse from trigger circuit 71 and develops a first signal. This first signal is coupled to tone switch 73, timing circuit 76, and latch circuit 77.

The first signal coupled to tone switch 73 causes it to energize and provide a ground path for tone oscillattors 74 and 75. With the ground path provided, tone oscillators 74 and 75 will develop their particular tone frequency signals which will be coupled to modulator 22 to modulate the carrier wave which is transmitted. Tone oscillators 74 and 75 may include resonant reed devices or tuned circuits, tuned to operate at a particular frequency.

The first signal coupled to timing circuit 76 causes it to develop a timing signal a predetermined period of time after bistable 72 develops a first signal. The timing signal is coupled back to bistable 72 causing it to revert to its original state ending the first signal.

The first signal coupled to latch circuit 77 causes it to energize and provide a ground signal to trigger circuit 71, in parallel with the ground provided by contact 27, to hold it enabled. By this system the push-to-talk switch could be momentarily operated, and the encoder will develop the particular tone signals for the time period required to actuate a decoder in another receiver. With the termination of the first signal due to the timing signal from timing circuit 76, latch circuit 77 is deactivated causing deactivation of trigger circuit 71.

The first signal developed by bistable 72 is also coupled to bistable 46 in control circuit 45, causing bistable 46 to change states and develop a first signal. The first signal developed by bistable 46 is coupled to the inhibit bistable, 51, causing it to also develop a first signal. The first signal developed by inhibit bistable 51 is coupled back to trigger circuit 71, preventing it from again developing a pulse in response to a subsequent actuation of the push-to-talk switch. The first signal developed by bistable 46 in control circuit 45 is also coupled to relay driver 47, which energizes causing relay 48 to operate and break the tone squelch ground path provided through contacts 49 of relay 48. The operation of the push-to-talk switch will in addition to the transmission of the tone frequencies for the predetermined period of time, prevent the tones from being transmitted with any subsequent transmission in the same series, and deactivate the tone decoder allowing the carrier squelch circuit to hold the audio circuitry of the receiver operative so long as a carrier is received.

At a termination of communication between the parties, the microphone is again placed in the hang-up box closing hang-up switch 29 and resetting the encoder-decoder as previously described.

As can be seen, an automatic tone encoder-decoder circuit for a radio communication receiver has been provided which substantially simplifies operation of the two-way radio. At the initiation of a transmission by one party, the tone is automatically transmitted a first time for a predetermined period of time. Initiation of the tone transmission deactivates the tone decoder in the operator's receiver, and prevents further actuation of the tone encoder. The receiver of the communications unit to which the message is transmitted, will energize in response to the correctly coded signal, preventing further operation of the tone decoder and inhibiting operation of the tone encoder. The series of exchanges between the parties will the proceed without delay due to the transmission of tones or the decoding of tones. This results in a significant improvement in the operation of the communications system. At the end of the series of exchanges, replacement of the microphone in the hang-up box will reset the encoder-decoder.

We claim:

1. An encoder-decoder circuit for a communications unit which includes a transmitter for transmitting a modulated carrier wave and a receiver for receiving a carrier wave and deriving the modulated signal therefrom, and for reproducing the modulating signals, and wherein the unit includes a microphone and a push-to-talk switch to be actuated for transmission, said encoder-decoder circuit including in combination, oscillator means coupled to said transmitter for providing thereto tone signals for transmission thereby, an oscillator control circuit coupled to said oscillator means, said oscillator control circuit being operative in response to actuation of the push-to-talk switch to energize said oscillator means and hold the same energized for a predetermined period of time, frequency selective circuit means coupled to said receiver, said frequency selective circuit means being operative to detect tones of predetermined audio frequencies in the modulating signals derived by said receiver and develop a detection signal in response thereto, control means coupled to the receiver, to said frequency selective circuit, and to said oscillator control circuit, said control means being responsive to said detector signal to render the receiver operative to reproduce the derived modulating signal and to inhibit operation of said oscillator control circuit, said control means being responsive to operation of said oscillator control circuit in response to actuation of said push-to-talk switch, to inhibit subsequent operation of the same and to render the receiver operative to reproduce the derived modulating signal.

2. The circuit of claim 1 including switch means coupled to said control means, said switch means being operative to reset said control means whereby said oscillator control circuit is rendered operative and said receiver is rendered inoperative to reproduce the derived modulating signal in the absence of said detection signal.

3. The encoder-decoder circuit of claim 2 wherein said control means further includes indicator means coupled to said frequency selective circuit means and said switch means, said indicator means being operated in response to said detection signal, said switch means selectively activating said indicator means and resetting the same.

4. The encoder-decoder circuit of claim 2 further including hang-up means for receiving the microphone, connected to said switch means, said control means being reset when the microphone is placed on said hang-up means, said receiver being rendered operative to reproduce the derived modulating signal when said microphone is removed from said hang-up means.

5. The squelch circuit of claim 1 wherein said oscillator means includes a plurality of oscillators for producing said tone signals of different frequencies.

6. The encoder-decoder circuit of claim 5 wherein said plurality of oscillators includes two oscillators for simultaneously providing tone signals.

7. The encoder-decoder circuit of claim 5 wherein said oscillator control circuit includes first circuit means operative in response to the actuation of the push-to-talk switch to energize said oscillator means, latch means coupled to said first circuit means and operative in response thereto to maintain said switch means in an operated state, and timing circuit means coupled to said first circuit means and operated in response thereto, said timing circuit means developing a timing signal to reset said switch means after a predetermined time, said first circuit means being coupled to said control means for energizing same to inhibit subsequent operation of said oscillator control circuit in response to subsequent actuation of the push-to-talk switch, and to render said receiver operative to reproduce the derived modulating signals.

8. The encoder-decoder circuit of claim 1 wherein said frequency selective circuit means includes a plurality of tone filters each being operative to couple a predetermined audio frequency tone therethrough, level detector means coupled to said tone filter means, said level detector means operative in response to said predetermined audio frequency tone being coupled thereto for a predetermined period of time to develop a first signal, and AND gate means coupled to said plurality of level detectors, said AND gate means operative in response to first signals from each of said plurality of level detectors to develop said detection signal.

9. The encoder-decoder circuit of claim 8 wherein said control means includes, switch means operative in response to said detection signal to render the receiver operative to reproduce the derived modulating signal, inhibit circuit means coupled to said switch means and operative in response to the energization thereof to inhibit operation of said oscillator control means, and reset circuit means coupled to said switch means and said first circuit means, said reset means operative in response to operation of said switch means to reset said first circuit means.

* * * * *